US008334036B2

(12) United States Patent
(10) Patent No.: US 8,334,036 B2
(45) Date of Patent: Dec. 18, 2012

Buchbinder et al.

(54) MULTI-LAYER MATERIAL COMPRISING SELF-ADHESIVE AND COLD SEAL COATINGS

(75) Inventors: Elisabeth Buchbinder, Nideggen (DE); Axel Niemöller, Düren Niederau (DE)

(73) Assignee: Sihl GmbH, Duren (DE)

( * ) Notice: Subject to any disclaimer, the term of this patent is extended or adjusted under 35 U.S.C. 154(b) by 554 days.

(21) Appl. No.: 12/248,854

(22) Filed: Oct. 9, 2008

(65) Prior Publication Data

US 2009/0098327 A1 Apr. 16, 2009

(30) Foreign Application Priority Data

Oct. 12, 2007 (EP) .................................... 07019997

(51) Int. Cl.
*B32B 9/00* (2006.01)
*B32B 7/12* (2006.01)

(52) U.S. Cl. ..................... 428/40.1; 428/41.8; 428/42.2; 428/42.3; 428/343; 428/354; 428/355 R

(58) Field of Classification Search ................. 428/40.1, 428/343, 354, 355 R, 41.8, 42.2, 42.3
See application file for complete search history.

(56) References Cited

U.S. PATENT DOCUMENTS 4,888,395 A 12/1989 Min
4,898,787 A 2/1990 Min et al.
5,070,164 A 12/1991 Min et al.
5,811,368 A 9/1998 Fukuchi et al.
5,912,981 A * 6/1999 Hansmire et al. ............. 382/116
2002/0014955 A1* 2/2002 Klitsgaard ................. 340/10.42
2002/0019256 A1 2/2002 Bennett et al.
2005/0071044 A1 3/2005 Yonge et al.
2006/0228480 A1 10/2006 Lin

FOREIGN PATENT DOCUMENTS

EP 0 287 628 5/1992
EP 1 159 724 12/2001
EP 1 586 447 A1 10/2005
FR 2 760 558 9/1998
WO WO 96/13823 5/1996
WO WO 00/55832 9/2000

* cited by examiner

*Primary Examiner* — Victor Chang
(74) *Attorney, Agent, or Firm* — Knobbe, Martens, Olson & Bear, LLP

(57) ABSTRACT

It is provided a multi-layer material comprising a self-adhesive layer coated on the reverse side of a first web, a release layer coated on the front side of a second web, the release layer being attached to the self-adhesive layer of the first web, wherein on the reverse side of the second web a cold seal adhesive layer is coated. Furthermore, a multi-layer tag manufactured from said multi-layer material is provided.

16 Claims, 1 Drawing Sheet

MULTI-LAYER MATERIAL COMPRISING SELF-ADHESIVE AND COLD SEAL COATINGS

CROSS-REFERENCE TO RELATED APPLICATIONS

This application claims priority of European Patent Office application 07 019 997.1, filed Oct. 12, 2007.

BACKGROUND OF THE INVENTION

1. Field of the Invention

The present invention relates to a multi-layer material which can be used for the manufacture of multi-layer tags. The multi-layer tag can be used as a standard self-adhesive label material, which can be adhered to various surfaces, or as a loop tag which can be wrapped round any object like an article, a handle, a packaging, followed by closing the loop by adhering two cold seal coating parts on the reverse side of the tag to each other.

2. Description of the Related Art

US 20050071044 describes multi-layer labels which can be separated into two labels consisting of two self-adhesive layers, so-called piggyback labels which are widely known in the industry. For example, for medical applications comparable labels are used. A typical multi-layer has the following layer assembly:

1. paper,
2. permanent self-adhesive coating,
3. release layer,
4. base material for release layer including carbonless printing function,
5. permanent self-adhesive coating,
6. release layer,
7. base material for release layer.

For those labels the base material for the release liner (layer 4) has implemented a carbon-less function (CF/CB-coating). The advantage of those labels is that due to the carbon-less pressure sensitive printing function two labels can be created with only one printing procedure. Typing errors become impossible and two labels are created e.g. one for labeling of a pharmaceutical bottle, and the other for being adhered into patient files.

For labeling of food-containers in grocery stores cold seal coated papers as described in EP 1 159 724 are proposed. The advantage of these labels is that the tags which is applied as a loop tag could be easily adhered as well as removed after the job is done and the containers could be easily cleaned and reused. A release coating which can be imprinted with standard techniques, e.g. flexo printing or thermal transfer printing, is applied to make sure that no sticking problem occurs when the material is wound up into reels. Due to the non-blocking feature of the cold seal adhesive the tag material can be printed with standard thermal, thermal transfer or inkjet printers. The composition of those kind of tags is as follows:

1. top coating,
2. thermal sensitive coating,
3. paper layer,
4. lamination adhesive,
5. tear resistant film,
6. self-adhesive coating,
7. release liner.

With those kind of materials the release liner is die-cut in a way that at the check-in desk at the airport only a part of the release liner is torn off from the self-adhesive coating, so that the tag can be looped around the handle in a similar way as described above. Additional self-adhesive labels, e.g., claim tags, required not by all, but many airlines can be die-cut from the thermal paper side due to the self-adhesive coating protected by the release liner.

In EP 1 159 724 a multi-layer tag for the application as baggage tags is described having the following construction:

1. top coating, having release features,
2. thermal sensitive coating,
3. paper,
4. lamination adhesive,
5. tear-resistant film,
6. lamination adhesive
7. paper,
8. cold-seal coating.

In comparison to the beforehand described baggage tag the latter baggage tag is easy to handle for the user. Especially for self-check-in counters, which do become more and more popular, where passengers have to make their own check-in procedure these tags have advantages. However, additional self-adhesive labels are not available by this kind of baggage tag.

SUMMARY OF THE INVENTION

Therefore, it is an object of the present invention to provide a material for the manufacture of tags which can be either used for any object like an article, a handle, e.g., for airline baggage, a packaging as a loop tag can be applied to various surfaces by its self-adhesive functionality.

The above object is met by a multi-layer material according to Claim 1, i.e., by a multi-layer material comprising a self-adhesive layer coated on the reverse side of a first web, a release layer coated on the front side of a second web, the release layer being attached to the self-adhesive layer of the first web, wherein on the reverse side of the second web a cold-seal adhesive layer is coated.

In a certain embodiment of the invention the front side of the first web of the multi-layer material or tag is either printable without any additional printing layer(s) coated on the first web or is printable on one or more additional printable layer(s) coated on the first web. Uncoated printable first webs can be selected for example from the group comprising cardboards, paper layers, paper laminates or even printable polymer films, e.g. Teslin. Alternatively, a printable layer can be coated on the first web in order to render the front side of the first web printable.

Examples for the above additional printable layer(s) are heat-sensitive recording layers or inkjet receiving layers. Further examples are thermal transfer receiving layers, offset printing layers, flexographic printing layers or laser recording layers.

According to preferred embodiments of the invention the front side of the first web or respectively the additional printable layer(s) coated on the first web of the multi-layer material or tag has release properties or is coated with a release layer. Release properties or a release layer is useful to make sure that no sticking problems occur when the multi-layer material or tag is wound-up into reels.

In another special embodiment of the invention the multi-layer material or tag includes a RFID (radio frequency identification device). According to this embodiment the RFID is implemented either directly on the front side or the reverse side of either the first web or the second web. RFIDs comprise chip and antenna for responding to an electromagnetic high frequency detection signal. Active and passive devices may be used. They can be incorporated into the multi-layer material or the multi-layer tag made from that material by known lamination techniques, e.g. by adhering the pre-manufactured RFID to one of the surfaces of the 2 webs by means of an adhesive.

In another special embodiment of the invention the multi-layer material or tag comprises security features implemented in the multi-layer material, e.g., security papers with watermarks or fluorescent fibers, or in the form of an interlayer printing, coloured adhesives or web layers. Preferably, more than one security feature is present in the material to prevent counterfeiting more effectively. More preferably these security features are not obvious and are only detectable by special means. For example fluorescent fibers or coatings may be made visible in UV light or colored or printed layers inside the material construction may be only visible if the material is separated or torn. For example, appropriate features can also be incorporated by UV-absorbing, UV-reflecting or UV-fluorescing agents as well as other colorants with special properties.

For certain applications a coloured opaque or transparent material or tag might be desired. Therefore, one or both of the two webs or one or more of the coatings may be coloured to get finally a coloured laminate. Colourfulness of the material can be reached by various material constructions. For example, one or more of the paper layer(s) are coloured paper(s) or one or more of the polymer film(s) are coloured polymer film(s) or one or more of the adhesive layers contain colouring agents. A colouring agent can be added to one or more of the printing coating(s) which may be located on the outer side of the first web. Of course, combinations of the latter material constructions are also an option.

In a particularly preferred embodiment of the invention the multi-layer material or tag comprises a die-cut for allowing to detach a predetermined section of the first web from the multi-layer material or tag, respectively. In order to establish this desirable function the die-cut only concerns the first web, and for proper function, preferably also the self-adhesive layer and/or the optional layers on the front side of the first web.

DETAILED DESCRIPTION OF THE PREFERRED EMBODIMENT

Figure 1:
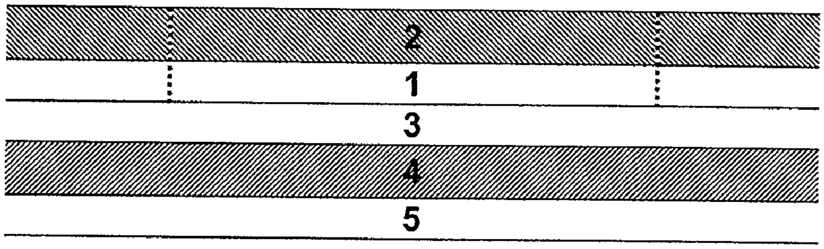
FIG. 1 shows the assembly of a multi-layer material according to the invention wherein a self-adhesive layer (1) coated on the reverse side of a first web (2), a re-lease layer (3), coated on the front side of a second web (4), the release layer being attached to the self-adhesive layer (1) of the first web (2), wherein on the reverse side of the second web (4) a cold seal adhesive layer (5) is coated.
Figure 2:
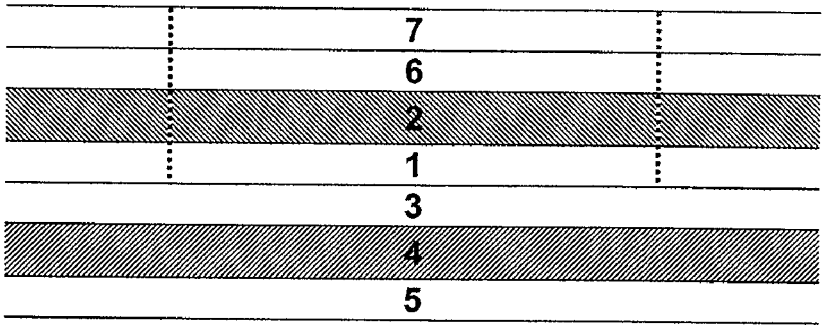
FIG. 2 shows another embodiment of the multi-layer material according to the invention. Therein a printable layer (6) coated with a release layer (7) is added to the front side of the first web (2) of the multi-layer material according to FIG. 1.
Figure 3:
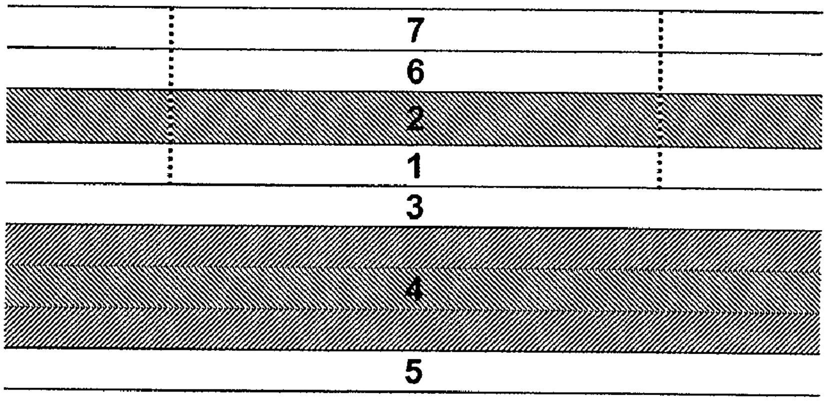
FIG. 3 shows a further embodiment of the inventive multi-layer material wherein the material corresponds to the material shown in FIG. 2 but the second web (4) is a 3-ply laminate (4).

In general, the first web and/or the second web may be individually selected from the group comprising cardboards, paper layers, polymer films, metallized and/or fiber reinforced layers, metallized polymer films, non-woven fleece webs, metal foils and two ply or three ply laminates of any of the foregoing materials or mixtures thereof. In a preferred embodiment of the invention the first web and/or the second web is/are individually a 2-ply paper/film or a 3-ply paper/film/paper laminate.

In certain embodiments of the invention the first (2) and/or second (4) web is a polymer film. These polymer films can be water permeable or water impermeable, however, preferred are water impermeable polymer films. The water impermeable polymer films are typically made of polyolefine, e.g. polyethylene, polypropylene, or polyester, e.g. polyethylenetherephthalate, polyurethane, polyacrylate, polycarbonate, polyvinylchloride or polyamide, polyimide, polystyrene, cellulose acetates, biodegradable films (e.g. corn-starch or polyaminoacids based). These polymer film(s) are either non-oriented, unidirectionally oriented or biaxially oriented. Examples for these films are Mylar and Melinex biaxially oriented polyester film of DuPontTeijin, Valeron® polyethylene film, cast polypropylene films, monoaxially oriented polypropylene films or biaxially oriented polypropylene films (BOPP).

Furthermore, the polymer films can also be a semipermeable film, so that water or solvent permeability is restricted, e.g. a film with small holes or a porous film. For further details it is referred to EP 1 586 447 A1.

The polymer films themselves have a thickness in the range of 3 μm to 250 μm, preferably 9 μm to 70 μm, more preferably 12 μm to 50 μm. Thinner webs might be mechanically too weak. Thick webs up to 250 μm have still enough flexibility for the intended use.

Generally, the polymer films are selected to yield high mechanical strength of the inventive multi-layer material or tag. The tensile strength of the multi-layer material or tag, if a polymer film is used, according to ISOI 924 is typically in the range of 40 to 3000 N/15mm, preferably above 100 N/15mm, more preferably above 170 N/15mm. If biaxially oriented polymer films are used a high initial tear strength is achieved while tear propagation might be low. With uniaxially oriented polymer films high tear strength is achieved only in the cross direction to the orientation. Non-oriented polymer films are useful for both good initial tear resistance as well as good propagation tear.

The multi-layered material or tag, if a polymer film is used, preferably has a tear resistance according to ASTM-D1004 of above 25 N, preferably above 30 N.

The polymer films can be treated inline in the lamination process by a corona discharge, a flame treatment or a chemical etching pretreatment, e.g. by a fluor treatment, or by primer coating on one or both sides of the polymer film prior to adhesive coating. This pre-treatment is able to increase the surface tension and leads to improved wetting and adhesion of the water based film forming adhesive. It is commonly not necessary for already treated films. Polyolefine films, particularly polypropylene films, however, are critical to adhere and preferably are treated to ensure perfect bonding of the adhesive. For further details it is referred to EP 1 586 447 A1.

The paper layers as well can be water permeable or water semipermeable, however, water permeable papers are preferred. The water permeable papers can be made of paper, kraft paper, card boards, glassine or pergamin paper, food packaging paper or impregnated paper as well as fiber reinforced papers.

The paper layers and/or card boards of the multi-layer material according to the invention independently have a weight in the range of 10 to 300 g/m$^2$, preferably 30 to 250 g/m$^2$, more preferably 50 to 150 g/m$^2$. The thickness of the paper layer(s) is typically in the range of 10 to 350 μm, preferably 30 to 300 μm. For the production of a multi-layer material according to the present invention different paper grades can be used for web 1, and web 2, respectively.

The non-woven fleece webs can be made of polyester, polypropylene, polyamide, viscose or cotton based materials, produced according to a dry laid, wet-laid or spunbond process.

In a preferred embodiment of the invention the first web of the multi-layer material or tag may be any of the above described materials, but preferably the first web is a cardboard or a paper layer, preferably having a weight of 30 to 250 g/m$^2$, more preferred of 50 to 150 g/m or a polymeric film, preferably with a thickness in the range of 3 to 250 μm, more preferably in the range of 9 μm to 70 μm, while as the second web a glassine or a clay-coated paper, preferably having a weight of 40 to 100 g/m$^2$, more preferably a weight of 50 to 80 g/m$^2$, or a polymeric film, preferably based on polyethylene, polypropylene, polyester or starch, may be used, preferably with a thickness of 3 μm to 250 μm, and more preferably 9 μm to 70 μm.

Additionally, or in another preferred embodiment of the invention the tear resistance of the multi-layer material is above 25 N, preferably above 30 N, and the tensile strength is in the range of 40 to 3000 N/15mm, preferably above 100 N/15mm, more preferably above 170 N/15mm, under the proviso that the multi-layer material comprises at least one polymeric film either as the first web (2) and/or the second web (4) and/or as part of the 2-ply or the 3-ply laminate.

The release layer coated on the front side of the second web, which is being attached to the self-adhesive layer of the first web, is preferably based on polysiloxanes. A polysiloxane based release layer is preferred due to the high release ability of the polysiloxane compounds in contact to self-adhesive coatings. The coating is done according to the production of conventional release papers or films based on polysiloxanes, e.g. as described in US2006/0228480.

The self-adhesive layer on the reverse side of the first web is a permanent or re-movable pressure sensitive adhesive layer. Due to the release coating on top of the second web the pressure sensitive adhesive can be removed without any residues. The release layer typically comprised a polysiloxan compound and can be adjusted to the required release forces. Release forces are measured according to FTM 3 (FINAT Test Method 3; FINAT, The Hague Netherlands, is a well known organisation that promotes the interests of the self-adhesive labelling industry) and are preferably between 10 cN/50mm and 300 cN/50mm. A typical pressure sensitive adhesive system used is based on acrylic or polyvinylacetate polymers or copolymers and/or mixtures thereof. It can be either solvent or water based. Alternatively, hot melt pressure sensitive adhesives may be used, e.g. on basis of thermoplastic elastomers or UV curing acrylics. The adhesive layer of the above types typically has a dry coating weight in the range of 3 to 50 g/m$^2$, preferably 10-25 g/m$^2$.

The peel adhesion on glass according to FTM1 (FINAT Test Method 1; FINAT, The Hague Netherlands, is a well known organisation that promotes the interests of the self-adhesive labelling industry) after 20 min is typically between 10 N/25mm to 30 N/25mm for permanent pressure sensitive adhesives and 0.2 N/25mm to 10 N/25mm for removable pressure sensitive adhesives. The shear resistance on stainless steel according to FTM8 (FINAT Test Method 8) is above 600 minutes, preferably above 800 minutes.

The pressure sensitive adhesive coating is done with conventional coating techniques: e.g. for dispersion or solvent based systems coating techniques like meyer bar, roller coating, rotogravure or die coating techniques are used. For hot melt based systems roller coating or die systems are suitable.

The cold seal adhesive layer coated on the reverse side of the second web preferably is based on mixtures of natural or synthetic latex dispersions and one or more of the dispersions selected from the group comprising an aqueous polyacrylic dispersion, a poly(meth)acrylate dispersion, an acrylate and/or methacrylate based co-polymer dispersion. A typical example is a cold seal adhesive composition containing 40-65% by weight, preferably 50-60% by weight, of a natural latex emulsion, preferably with an ammonia content giving pH values of appr. 10, 20-50% by weight, preferably 30-40% by weight of a styrene-acrylate emulsion, and small (1-5% by weight) amounts of wetting agents, latex stabilizers, antioxidants, biocides, thickeners, and optionally tackifiers. Some examples of cold seal adhesives based on natural latex emulsion and aqueous polyacrylate dispersions are described in U.S. Pat. Nos. 5,070,164, 4,898,787 and 4,888,395.

The cold seal adhesive layer typically has a dry coating weight in the range of 2 to 25 g/m$^2$, preferably in the range of 5 to 15 g/m$^2$.

The peel strength of the cold seal adhesive layer measured with reference to FTM1 3 minutes after contacting two surfaces of the cold seal adhesive layer to each other is typically at least 4 N/25mm, preferably at least 6 N/25mm. This is generally necessary to achieve a permanent bond which is not destroyed in the application, e.g. during transport. This may be important for many applications as tags must survive until the final destination, e.g. of an airline baggage or an article, is reached. Most preferably the cold seal adhesive bond is so strong that the webs are ruptured. This is particularly the case if a paper layer is coated with the cold seal adhesive.

The cold seal adhesive layer may completely or only partially be disposed on the reverse side of the second web of the multi-layer material or tag. A partially disposure is particularly advantageous to reduce cost or to avoid contact of the cold seal layer to the object in the final application. Preferably the cold seal layer is applied in stripes, most preferably in the web direction of the both flexible webs. Nevertheless, any useful pattern of the cold seal adhesive may be chosen depending on the application. As the cold seal adhesive is only used in the areas which are contacted to each other in the final application only these areas need to have the adhesive.

The cold seal adhesive is applied with conventional coating techniques like roller coating, meyer bar, die systems or rotogravure. For the partial coating, the die system or rotogravure technique is preferred.

Furthermore, the front side of the first web or, respectively, the additional printable layer has release properties or is coated with a release layer. These release proper-ties or the release layer, respectively, prevents the front side of the multi-layer material or tag to stick too tight to the cold seal adhesive layer at the opposite side of the multi-layer material or tag in case the material or tag is furled. In other words, the release layer prevents blocking during unwinding of the material or tag from a reel or roll. The optional release layer may be prepared by applying a composition comprising an organic antiblocking agent selected from polyamides, amide waxes, montan waxes, polyolefin waxes, ester waxes, calcium stearate, zinc stearate, polyvinyl esters, polyacrylate copolymers, fatty acid esters, long chain alkyl products, polysaccharides, polysiloxanes and mixtures thereof.

The release force of detaching the cold seal adhesive layer during unwinding a reel of the inventive multi-layer material measured according to FTM3 is preferably max. 250 N/50mm, more preferably max. 200 N/50mm, and most preferably is below 100 N/50mm.

The optional release layer is applied by any conventional coating techniques as mentioned before. However, meyer bar or rotogravure is preferred.

In certain embodiments of the invention the first and/or the second web, preferably the second web, is a 2-ply or 3-ply laminate comprising one or more polymer film(s) and one or more paper layer(s), wherein the polymer film(s) and the paper layer(s) being in an alternating manner permanently attached to each other by a film forming adhesive. The 2-ply or 3-ply laminate may be a transparent laminate. Such 2-ply or 3-ply laminates are described in detail in EP 1 586447 A1.

Preferably, the laminate is a 3-ply laminate having two paper layers on the outside and one polymer film as a centre layer of the laminate.

The advantage of these kinds of laminates is that due to the polymer film—or films—which stabilises the paper layer(s) it is possible to use less paper fibers. This renders the paper layer(s) more resistant against humidity and allows to apply water or solvent based adhesive coatings to the laminates of the invention, either on an out-side polymer film layer or paper layer, respectively. Furthermore, the polymer film(s) lead to high mechanical strength of the laminate, particularly if biaxially oriented films are used. The lamination is achieved by standard lamination processes, preferably by the roll-to-roll laminating process, e.g. as described in EP 1 586447 A1.

The polymer film(s) of the 2-ply or 3-ply laminates can be water permeable or water impermeable, however, preferred are water impermeable polymer films. The water impermeable polymer films are typically made of polyolefine, e.g. polyethylene, polypropylene, or polyester, e.g. polyethylenetherephthalate, polyurethane, polyacrylate, polycarbonate, polyvinylchloride or polyamide, polyimide, polystyrene, cellulose acetates, biodegradable films (e.g. corn-starch or polyaminoacids based). These polymer film(s) are either non-oriented, unidirectionally oriented or biaxially oriented. Examples for these films are Mylar and Melinex biaxially oriented polyester film of DuPontTeijin, Valeron® polyethylene film, cast polypropylene films, monoaxially oriented polypropylene films or biaxially oriented polypropylene films (BOPP). Further, the polymer films can also be a semi-permeable film, so that water or solvent permeability is restricted, e.g. a film with small holes or a porous film. The polymer films can be pre-coated or pre-treated, e.g. by corona, flame or chemical treatment prior to lamination.

The polymer film(s) incorporated in the 2-ply- or 3-ply laminates have a thickness in the range of 3 μm to 250 μm, preferably 9 μm to 70 μm, more preferably 12 μm to 50 μm. Thinner webs might be mechanically too weak. Thick webs up to 250 μm have still enough flexibility for the lamination process.

The paper layer(s) of the 2- or 3-ply laminates according to the present invention independently have a weight in the range of 10 to 80 g/m$^2$, preferably 12 to 60 g/m$^2$. The thickness of the paper layer(s) is typically in the range of 10 to 90 μm, preferably 12 to 70 μm. For the production of 3-ply paper/film/paper laminates different paper grades can be used on both sides of the film.

In an exemplary embodiment of the invention the laminates which may be used for web 1 and/or 2 are manufactured in a roll-to-roll laminating process. For details of this roll-to-roll laminating process, especially with respect to the film forming adhesive composition and its coating conditions, with respect to the paper layer(s) and its preferred properties, with respect to the polymer film(s) and its preferred properties and with respect to further (optional) components and conditions in the said process it is referred to EP 1 586 447 A1. Besides this special wet laminating process any conventional wet or dry lamination process could be used for the production of the 2-ply paper/film or 3-ply paper/film/paper laminates. Suitable adhesives for the dry lamination process could be acrylic or ethylene vinyl acetate based polymers or co-polymers either solvent or water based, one- or two-component systems, solvent free one- or two-component based adhesive acrylic/polyurethane based systems, adhesives cured by UV-radiation or electron beam radiation and hot melt based on ethylenevinylacetate, amorphous poly-alpha-olefines or styrene isoprene/styrene butadiene based polymers systems.

The additional printable layer is a heat sensitive recording layer, an inkjet receiving layer, a thermal transfer receiving layer, an offset printing layer, a flexo-printing layer or a laser recording layer.

For example, an ink jet receiving coating comprises cationic sizing or pigments and/or organic binders. Preferred pigments consist of crystalline or amorphous ox-ides or hydroxides of metals or semimetals as for example silicium, magnesium, calcium, aluminum, or zinc. Preferred pigments are silica, e.g. precipitated, fumed or sol-gel type silica, gibbsite, bayerite, nordostrandite, boehmite, pseudoboehmite, diaspore, alumina, particularly fumed alumina, alumina hydrate, magnesium silicate, basic magnesium carbonate, titanium (di)oxide, aluminium silicate, calcium carbon-ate, e.g. precipitated, talc, clay, hydrotalcite, kaolin or mica, inorganic matters such as diatomite, organic matters such as resinous pigments made of urea-formalin resins, ethylene resins, styrene resins, acrylate, polyamide resins or combinations thereof. Particle size and surface area are main parameters for choosing pigments for ink jet coatings.

Furthermore, the coating may render the prints waterfast even though water based dye inks are used. This effect is commonly achieved by adding cationic moieties or mordants (e.g. cationic polymers) to the surface of a porous ink jet layer. As the ink jet coating preferably comprises inorganic pigments a binder or binder system is necessary to strengthen the coating. Water soluble polymers like polyvinylalcohol, polyvinylpyrrolidone, gelatine, starch, cellulosic polymers as well as polymer emulsions are used as binder.

The ink jet printable surface can be matte, semi-matte or glossy, whereby the gloss levels can be in a range between 1% and 90% gloss at 60° measuring angle (ISO 2813). Matte coatings are achieved with inorganic pigments, e.g. silica, with mean particle diameters of 1 to 20 micron. Glossy ink jet coatings are designed from particles below 1 micron, particularly in the range or 20 μm to 300 nm. These coatings have to have a very smooth surface for a high gloss effect. This can be achieved e.g. in a cast coating process which preferably comprises a precoated paper with a special glossy top coating. These papers have a very fine porous coating structure which is still water vapour permeable. Papers with barrier coatings or film forming ink jet layers are possible to be used for lamination as well.

Heat sensitive papers are commercially available and widely used for label, tag and ticket applications as well as other applications. Generally, these papers can comprise pre-coatings, top-coatings and back-coatings additionally to the heat sensitive layer. Preferably, top-coatings with release properties are used in this invention and more preferably zinc stearate is used as release agent in this coating. The technology of heat sensitive (thermal) papers is described in the literature, e.g. in U.S. Pat. No. 5,811,368 and references cited therein.

After the production of the multi-layer material the multi-layer tag is produced by slitting, die cutting and printing depending on the application. For further details please look at the examples described.

EXAMPLES

Example 1

An 80 $g/m^2$ label paper is coated with a hot-melt based self-adhesive layer (pressure sensitive adhesive) having a coating weight of approx. 20 $g/m^2$. The pressure-sensitive adhesive layer is protected with a siliconized 65 $g/m^2$ white glassine paper liner. In the second production step, the reverse (non-siliconized) side of the release liner is coated with a cold seal dispersion adhesive having a dry coating weight of 4 $g/m^2$. In the same production step the front side of the 80 $g/m^2$ paper is coated with a release-coating comprising calcium stearate. In an additional step the resulting self-adhesive and cold seal label material is printed and die-cut from the label paper side and the release liner is perforated within suitable distances from the reverse side. The resulting multi-layer tags can be separated easily and used in grocery stores for the labelling of goods as self-adhesive labels or as loop tags depending on the article which has to be labelled. The peel strength of the self adhesive layer and the cold seal layer according to FTM1 is approx. 18N/25mm and approx. 7N/25mm, respectively (after 3 minutes). The release values according to FTM3 for the finished die cut material is approx. 80 cN/50mm.

Example 2

In a first production step a tear-resistant 30 μm BOPP-film (biaxial oriented polypropylene film) is coated with a polysiloxane-based release-coating. In a second production step a tear resistant paper/siliconized film-laminate is produced by applying a water-based acrylic dispersion to the reverse side of the siliconized film followed by drying this lamination adhesive and laminating the adhesive side of the film to a 30 $g/m^2$ paper (dry lamination process). In a third production step, a 80 g top coated heat sensitive paper is self-adhesive coated by using approximately 20 $g/m^2$ of a hot-melt based pressure-sensitive adhesive. The adhesive is protected with the siliconized film/paper laminate as described above. In a fourth production step the paper side opposite to the heat sensitive side is coated with a cold-seal adhesive based on natural rubber with a coating weight of approximately 8 $g/m^2$. The top-coating of the thermal paper has release properties sufficient for the cold-seal adhesive, as described in EP 1 159 724 due to its content of zinc stearate. In a following step this multi-layer material is printed by flexo-printing, die-cut and perforated to produce the final multi-layer tag which is suitable for airline baggage tag applications. The resulting airline bag tag includes a claim tag and additional stubs. It can be used either as loop tag or as self adhesive label for the transportation e.g. of car-tonages. An additional advantage compared to a multi-layer tag as described in example 3 is that due to the additional paper layer laminated in production step 2, paper tear is achieved, when the tag looped around an handle is removed. Some air-lines require this characteristic as an additional security feature for a baggage tag material used in this application.

The peel strength of the self adhesive layer and the cold seal layer according to FTM1 is approx. 18N/25mm and approx. 7N/25mm, respectively (after 3 minutes). The release values for the finished, die-cut material is approx. 60 cN/50mm.

Example 3

In a first production step a tear resistant 30 μm BOPP-film is coated with a polysiloxane based release coating. In a second production step a 80 $g/m^2$ top coated thermal paper is coated on the reverse side with a self-adhesive layer by applying approximately 20 $g/m^2$ of a hot-melt base pressure sensitive adhesive. The adhesive is protected with the siliconized 30 μm BOPP-film. In a third production step the reverse side of the siliconized film is coated with a cold seal adhesive having a coating weight of approx. 10 $g/m^2$ after corona treatment of the polypropylene surface. The top-coating of the thermal paper has release properties sufficient for the cold-seal adhesive, as described in EP 1 159 724 due to its content of zinc stearate. In a following step the material can be printed in an offset press with UV-curing inks, die-cut and perforated suitable for airline baggage tag applications. The resulting tear-resistant airline baggage tag can be used either as a self-adhesive tag or can easily be looped around the baggage handle. Furthermore an additional self-adhesive label which can easily be taken off is used as claim tag applied to the passenger receipt.

The peel strength of the self adhesive layer and the cold seal layer according to FTM1 is approx. 15-20N/25mm and approx. 6N/25mm, respectively (after 3 minutes). The release values for the finished, die-cut material is approx. 80 cN/50mm.

Example 4

In a first production step on the reverse side of an 80 g paper coated with an ink jet printable layer RFID labels with self adhesive coating are dispensed in a distance suitable to the latter finished multi-layer tag. In a second production step a white siliconized release paper is coated with a dispersion based acrylic adhesive having a coating weight of approx. 18 $g/m^2$ on the siliconized paper side. The 80 g inkjet paper with the RFID labels on the reverse side is laminated to this self-adhesive coated release liner. In a third production step the reverse side of the produced laminate which means the reverse side of the release liner is coated with a cold seal dispersion having a coating weight of approx. 6 $g/m^2$. The resulting multi-layer material is converted into tags by printing, die cutting and perforating. The finished tags can be printed by any conventional ink-jet printing technique and are capable for being used for labelling applications which require RFID labels. It can be used in grocery stores for the labelling of goods as self-adhesive labels or as loop tags depending on the material which has to be labelled.

Example 5

An 80 $g/m^2$ label paper having a watermark and UV active fibers of different colour is one-side coated with a blue colour via flexographic printing. In a second production step the colour coated paper side is coated with a hot-melt based self-adhesive layer (pressure sensitive adhesive) having a coating weight of approx. 20 $g/m^2$. The pressure-sensitive adhesive layer is protected with a siliconized 65 $g/m^2$ yellow glassine paper liner. In the second production step, the reverse (non-siliconized) side of the release liner is coated with a cold seal dispersion adhesive having a dry coating weight of approx. 4 $g/m^2$. In the same production step the front side of the 80 $g/m^2$ paper is coated with a release-coating comprising calcium stearate. In an additional step the resulting self-adhesive and cold seal label web is printed and die-cut from the label paper Side and the release liner is perforated within suitable distances from the reverse side. The resulting multi-layer tags can be separated easily and used in grocery stores for the labelling of goods as self-adhesive labels or as loop tags depending on the material which has to be labelled. For counterfeit applications, due to the security functions it is easy to recognise that this is the original tag. The peel strength of the self adhesive layer and the cold seal layer according to FTM1 is approx. 18N/25mm respectively approx. 7N/25mm (after 3 minutes). The release values according to FTM3 for the finished, die cut material is approx. 80 cN/50mm.

What is claimed is:

1. A multi-layer tag for forming a loop, which comprises a front side and a reverse side, comprising:

first and second webs, wherein the first web is towards front side of the tag with respect to the second web;

a first release layer being coated on the front side of the second web; and a cold seal adhesive layer coated on the reverse side of the second web, wherein the multi-layer tag further comprises a self-adhesive layer coated on the reverse side of the first web, wherein, the front side of the first web is either machine-printable without any additional printable layer(s) or is machine-printable on one or more additional printable layer(s) coated on the front side of the first web, wherein the front side of the first web or, respectively, the additional printable layer has release properties or is coated with a second release layer, wherein the first release layer is attached to the self-adhesive layer of the first web, and positioned between the first and second webs, and wherein the first web comprises a die-cut for allowing detachment a predetermined section of the first web from the multi-layer tag.

2. The multi-layer tag according to claim 1, wherein the cold seal adhesive layer is based on mixtures of natural or synthetic latex dispersions and one or more of the dispersions selected from the group comprising an aqueous polyacrylic dispersion, a poly(meth)acrylate dispersion, an acrylate and/or methacrylate based copolymer dispersion.

3. The multi-layer tag according to claim 1, wherein the cold seal adhesive layer is completely or only partially disposed on the reverse side of the second web.

4. The multi-layer tag according to claim 1, wherein the cold seal adhesive layer has a dry coating weight of 2 to 25 g/m$^2$, preferably of 5 to 15 g/ m$^2$ and/or a peel strength with reference to FTM1 3 minutes after contacting two surfaces of the cold seal adhesive layer to each other of at least 4 N/25 mm, preferably at least 6 N/25 mm.

5. The multi-layer tag according to claim 1, wherein the release layer is a coating based on or the release properties are based on a composition comprising an antiblocking agent selected from the group consisting of polyamides, amide waxes, montan waxes, polyolefin waxes, ester waxes, calcium stearate, zinc stearate, polyvinyl esters, polyacrylate copolymers, fatty acid esters, long chain alkyl products, polysaccharides, polysiloxanes and mixtures thereof.

6. The multi-layer tag according to claim 5, wherein the release force ac-cording to FTM3 of unwinding a reel of the multi-layer tag material is max. 250 N/50 mm, preferably max. 200 N/50 mm, and most preferably below 100 N/50 mm.

7. The multi-layer tag according to claim 1, wherein the additional printable layer is a heat sensitive recording layer, an inkjet receiving layer, a thermal transfer receiving layer, an offset printing layer, a flexographic printing layer or a laser recording layer.

8. The multi-layer tag according to claim 1, wherein a RFID is implemented either directly on the front side or on the reverse side of either the first web or the second web.

9. The multi-layer tag according to claim 1, wherein security features are implemented in the multi-layer tag material.

10. The multi-layer tag according to claim 1, wherein the first web, the self-adhesive layer and the one or more additional printable layer(s) coated on the first web, comprises a die-cut for allowing a predetermined section of the first web to be detached from the tag.

11. The multi-layer tag according to claim 1, wherein the first web and/or the second web is/are individually selected from the group comprising cardboards, paper layers, polymer films, metallized and/or fiber reinforced layers, metallized polymer films, non-woven fleece webs, metal foils and two ply or three ply laminates of any of the foregoing materials or mixtures thereof.

12. The multi-layer tag according to claim 11, wherein the first web and/or the second web is/are individually a 2-ply paper/film or a 3-ply paper/film/paper laminate.

13. The multi-layer tag according to claim 1, wherein the first web is a cardboard or paper layer, preferably having a weight of 30 to 250 g/ m$^2$, more preferably a weight of 50 to 150g/ m$^2$ or a polymeric film, preferably with a thickness in the range of 3 μm to 250 μm, more preferably in the range of 9 μm to 70 μm.

14. The multi-layer tag according to claim 1, wherein the second web is a glassine or clay-coated paper, preferably having a weight of 40 g/m2 to 100 g/ m$^2$, more preferably a weight of 50 g/ m$^2$ to 80 g/ m$^2$, or a polymeric film, preferably based on polyethylene, polypropylene, polyester or starch with a thickness of 3 μm to 250 μm, preferably 9 μm to 70 μm.

15. The multi-layer tag according to claim 1, wherein the tear resistance of the multi-layer tag material is above 25 N, preferably above 30 N, and the tensile strength is in the range of 40 to 3000 N/15 mm, preferably above 100 N/15 mm, more preferably above 170 N/15 mm, under the proviso that the multi-layer tag material comprises at least one polymeric film either as the first web and/or the second web and/or as part of the 2-ply or the 3-ply laminate.

16. The multi-layer tag according to claim 11, wherein the first web and/or the second web is/are a polymer film, the polymer film is either water permeable or water impermeable, preferably the polymer film is a water impermeable polyolefine, polyester, polyurethane, polyacrylate, polycarbonate, polyvinylchloride, polyamide, polyimide, polystyrene, cellulose acetate or biodegradable film.

* * * * *

UNITED STATES PATENT AND TRADEMARK OFFICE

CERTIFICATE OF CORRECTION

PATENT NO. : 8,334,036 B2
APPLICATION NO. : 12/248854
DATED : December 18, 2012
INVENTOR(S) : Buchbinder et al.

It is certified that error appears in the above-identified patent and that said Letters Patent is hereby corrected as shown below:

In the Specifications:

In column 4 at line 9-10 (approx.), Change “polyethylenetherephthalate,” to --polyethyleneterephthalate,--.

In column 4 at line 25, Change “themselves” to --itselves--.

In column 5 at line 11, Change “g/m” to --g/$m^2$--.

In column 5 at line 37, Change “re-movable” to --removable--.

In column 5 at line 40, Change “polysiloxan” to --polysiloxane--.

In column 7 at line 31-32, Change “polyethylenetherephthalate,” to --polyethyleneterephthalate,--.

In column 8 at line 23, Change “nordostrandite,” to --nordstrandite,--.

In column 8 at line 26, Change “carbon-ate,” to --carbonate,--.

In column 8 at line 41, Change “gelatine,” to --gelatin,--.

In column 8 at line 49, Change “or 20μm” to --of 20nm--.

In column 9 at line 59, Change “car-tonages.” to --cartonages.--.

In the Claims:

In column 11 at line 50, In Claim 4, change “15 g/ $m^2$” to --15 g/$m^2$--.

In column 12 at line 4, In Claim 6, change “ac-cording” to --according--.

In column 12 at line 34 (approx.), In Claim 13, change “250 g/ $m^2$,” to --250 g/$m^2$,--.

In column 12 at line 35 (approx.), In Claim 13, change “150 g/ $m^2$,” to --150 g/$m^2$,--.

In column 12 at line 40 (approx.), In Claim 14, change “40 g/m2” to --40 g/$m^2$--.

In column 12 at line 40 (approx.), In Claim 14, change “100 g/ $m^2$,” to --100 g/$m^2$,--.

In column 12 at line 41 (approx.), In Claim 14, change “50 g/ $m^2$ to 80 g/ $m^2$,” to --50 g/$m^2$ to 80 g/$m^2$,--.

Signed and Sealed this
Ninth Day of July, 2013

Teresa Stanek Rea
*Acting Director of the United States Patent and Trademark Office*